(12) United States Patent
Sun et al.

(10) Patent No.: US 9,704,001 B2
(45) Date of Patent: Jul. 11, 2017

(54) FILE SEARCHING SYSTEM AND FILE SEARCHING METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 198 days.

(21) Appl. No.: 14/446,578

(22) Filed: Jul. 30, 2014

(65) Prior Publication Data

US 2015/0035652 A1    Feb. 5, 2015

(30) Foreign Application Priority Data

Aug. 2, 2013    (CN) .......................... 2013 1 03334512

(51) Int. Cl.
*G06K 7/10*       (2006.01)
*G06Q 30/00*    (2012.01)
*G06K 17/00*    (2006.01)

(52) U.S. Cl.
CPC . *G06K 7/10366* (2013.01); *G06K 2017/0045* (2013.01); *G06Q 30/00* (2013.01)

(58) Field of Classification Search
CPC ....... G06K 7/10366; G06K 2017/0045; G06K 7/0008; G06K 19/0723; G06Q 30/00; G06Q 10/087; G06Q 30/02; G01B 7/004

USPC .............. 340/10.1, 10.6, 10.31, 10.41, 10.42
See application file for complete search history.

(56) References Cited

U.S. PATENT DOCUMENTS

| | | | | |
|---|---|---|---|---|
| 2001/0054983 | A1* | 12/2001 | Judd | ...................... H01Q 1/246 |
| | | | | 343/810 |
| 2004/0174257 | A1* | 9/2004 | Kuhns | ..................... G06K 19/02 |
| | | | | 340/508 |
| 2006/0066443 | A1* | 3/2006 | Hall | ................... G06K 7/10316 |
| | | | | 340/10.5 |
| 2007/0075873 | A1* | 4/2007 | Yang | ..................... G01S 5/0226 |
| | | | | 340/8.1 |

(Continued)

*Primary Examiner* — Yong Hang Jiang
(74) *Attorney, Agent, or Firm* — Steven Reiss

(57) ABSTRACT

A file searching system includes a file storage device and a terminal device. The file storage device defines a plurality of slots for storing files having radio frequency identification (RFID) tags, the file storage device has a plurality of antennas and associated indicators mounted to a corresponding slot one to one. The terminal device wirelessly communicates with a first transceiver of the file storage device. The terminal device includes a user interface (UI) unit. Each antenna receives RFID tag self-identifying information from an RFID tag stored in the corresponding slot and transmit the RFID tag self-identifying information along with antenna self-identifying information to the first transceiver for transmission to the terminal. The first transceiver receives control commands from the terminal and the file storage device actuates one of the plurality of indicators based on a received control command. A file searching method of the file searching device is also provided.

11 Claims, 5 Drawing Sheets

(56) References Cited

U.S. PATENT DOCUMENTS

| | | | |
|---|---|---|---|
| 2011/0088723 A1* | 4/2011 | Jensen | B05B 13/0436 134/18 |
| 2012/0001758 A1* | 1/2012 | Zhu | G06F 19/322 340/572.8 |
| 2012/0169478 A1* | 7/2012 | Spindel | G06K 7/0008 340/10.6 |
| 2012/0282579 A1* | 11/2012 | Tech | G09B 19/00 434/219 |

* cited by examiner

FILE SEARCHING SYSTEM AND FILE SEARCHING METHOD THEREOF

CROSS-REFERENCE TO RELATED APPLICATIONS

The present application is related to the co-pending U.S. patent application Ser. No. 14/448,341, entitled "FILE STORAGE DEVICE". This application has the same assignee as the present application and has been concurrently filed herewith. The above-identified application is incorporated herein by reference.

FIELD

The present disclosure relates to file searching systems, and particularly relates to a file searching system having radio frequency identification utility.

BACKGROUND

A company or an organization office needs to store a plurality of paper files. The paper files should be stored in an order and conveniently for searching. When a quantity of the paper files is large, searching efficiently for the right file becomes more important. Arching staff may also mis-store files.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
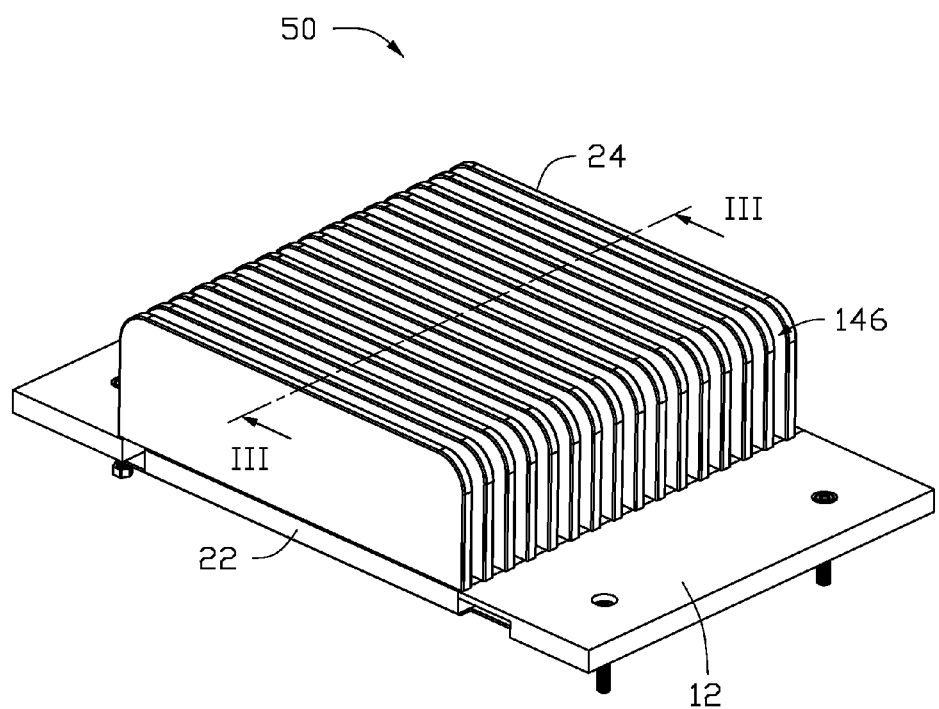
FIG. 1 is an isometric view of an exemplary embodiment of a file storage device.
Figure 4:
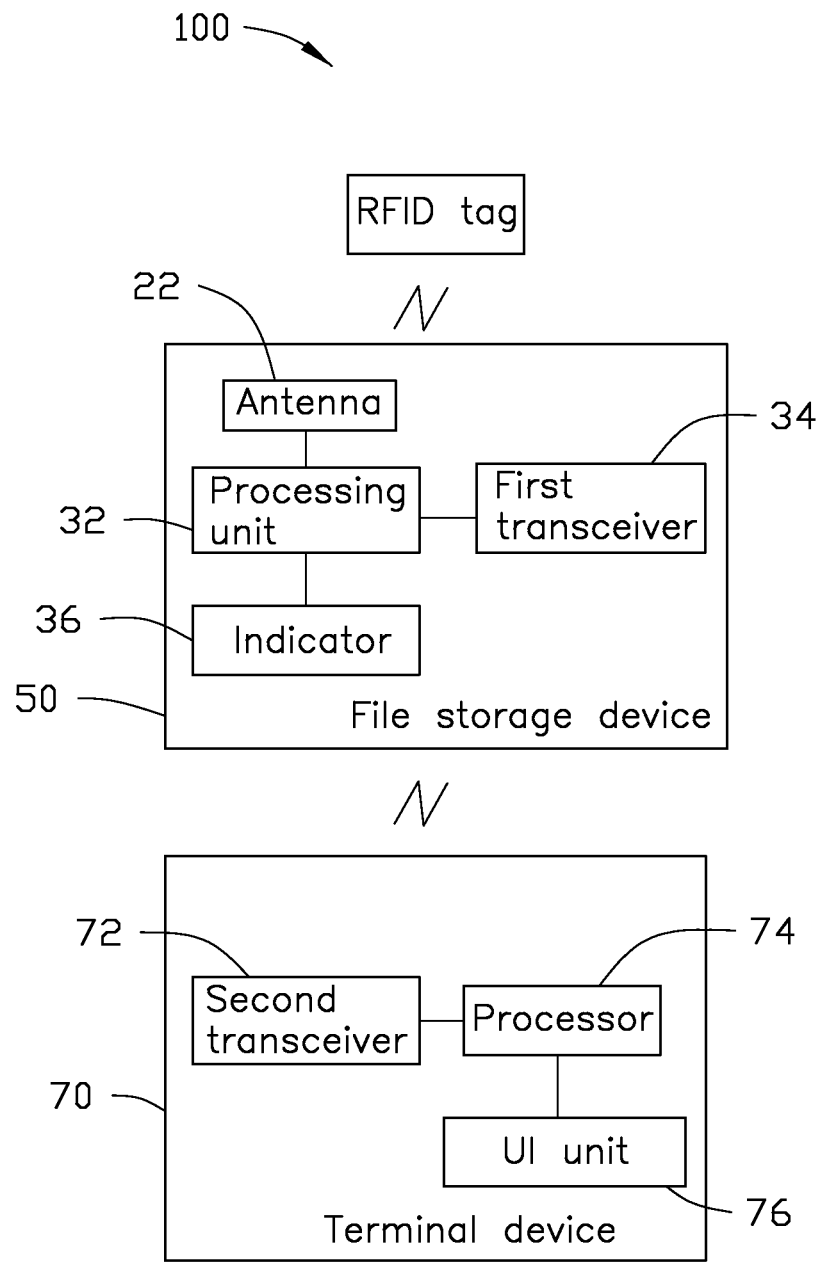
FIG. 4 is a block diagram of an exemplary embodiment of a file searching system.

FIGS. 1 and 4 illustrate at least one embodiment of a file searching system 100. The file searching system 100 includes a file storage device 50 and a terminal device 70. The terminal device 70 can establish wireless communicating connection with the file storage device 50, to transmit signals to or receives feedback signals from the file storage device 50.

Figure 2:
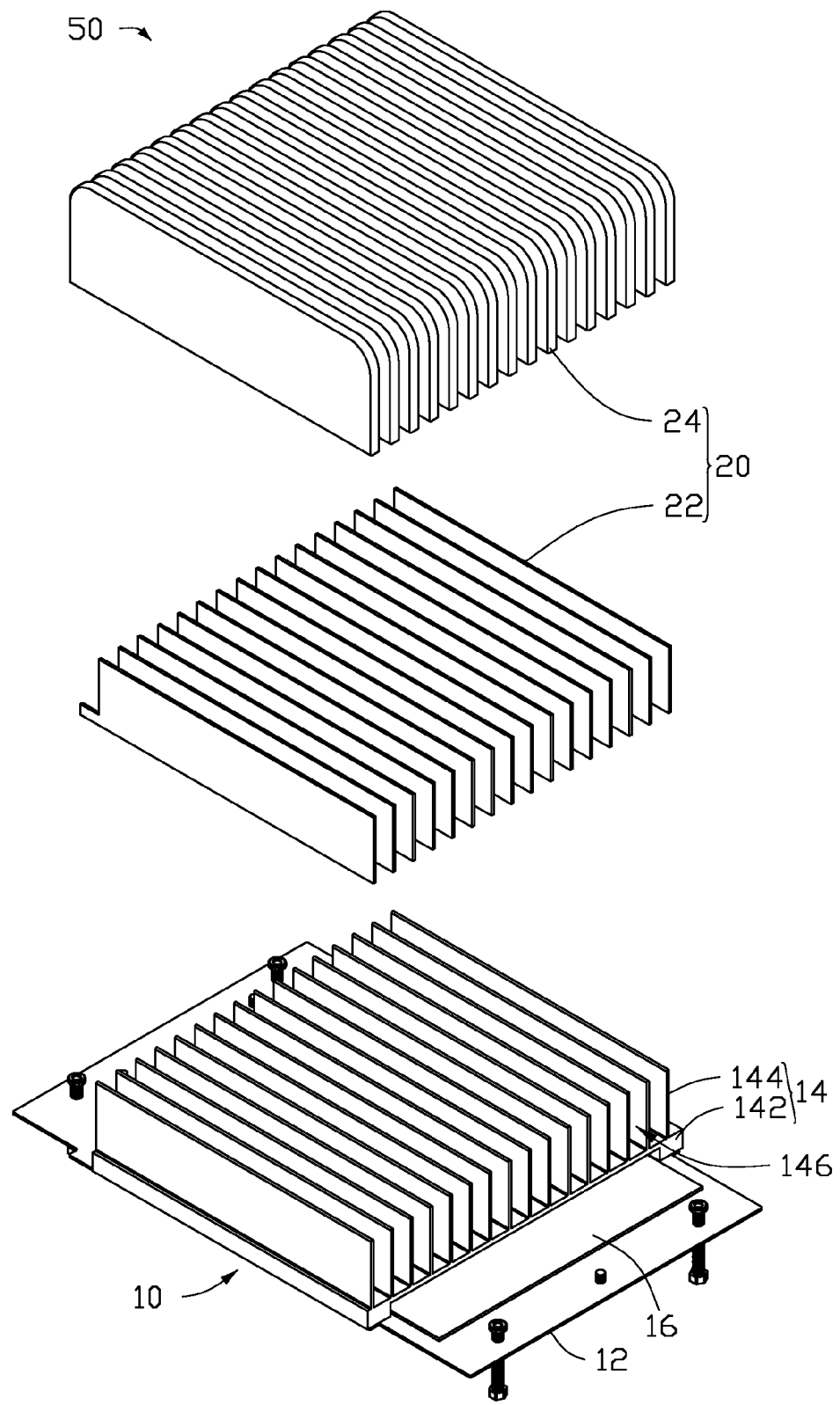
FIG. 2 is an exploded, isometric view of the file storage device of FIG. 1.
Figure 3:
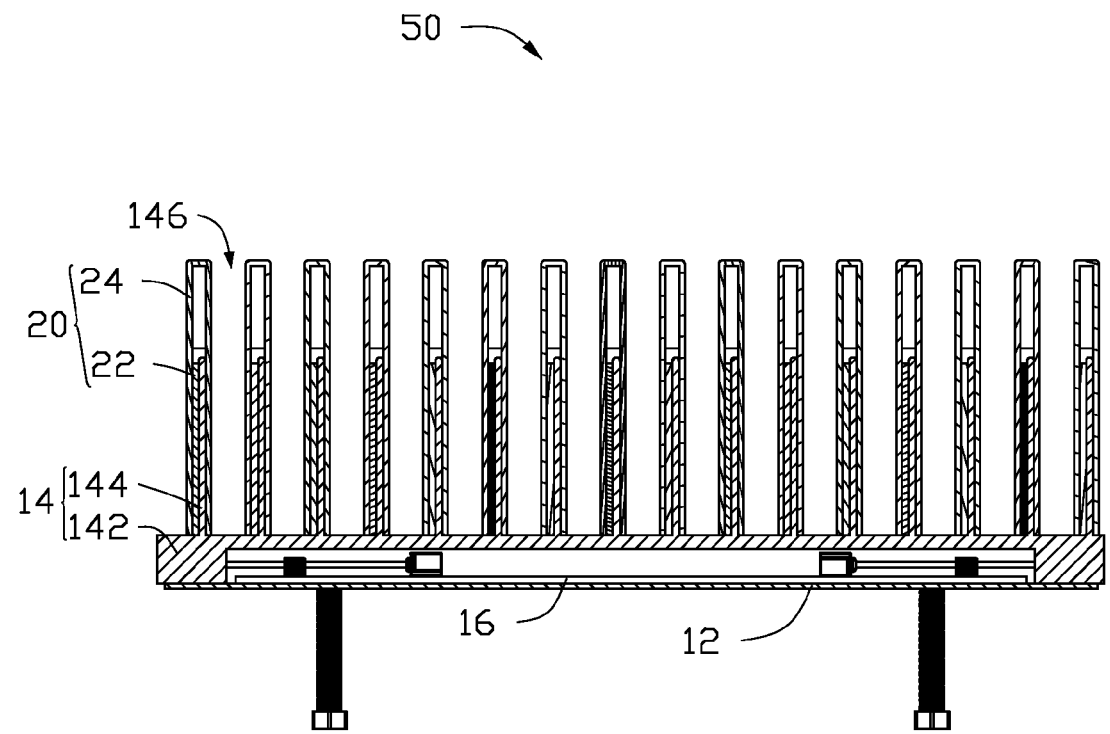
FIG. 3 is a cross-sectional view taken along line II-II of FIG. 1, showing a portion of the file storage device of FIG. 1.

Also referring to FIGS. 2 and 3, the file storage device 50 is for storing a number of files with radio frequency identification (RFID) tags affixed on corresponding files. The file storage device 50 includes a holder assembly 10 and an antenna assembly 20.

The holder assembly 10 includes a bottom board 12, a pedestal 14 mounted on the bottom board 12, and a circuit board 16. In at least one embodiment, the pedestal 14 is made of metal, such as aluminum. The pedestal 14 includes a base 142 and a plurality of interval boards 144. The interval boards 144 are perpendicularly arranged on an upper surface of the base 142. The interval boards 144 are evenly spaced from each other and are arranged in series, thereby forming a plurality of slots 146 between adjacent interval boards 144. The slots 146 may receive the files. The circuit board 16 is mounted between the bottom board 12 and the pedestal 14 and electrically connected to the antenna assembly 20, the circuit board 16 integrates a number of electronic components which can realize files searching function for the file storage device 50.

The antenna assembly 20 includes a plurality of antennas 22 and a plurality of housings 24 corresponding to the antennas 22. The antennas 22 are coupled to interval boards 144 and each antenna 22 corresponds to one slot 246. Each housing 24 receives one interval board 144 with one antenna 22, thereby protecting the antenna 22. In an exemplary embodiment, the antenna 22 can be adhered to a side surface of the interval board 144 by an adhesive. A working frequency of the antenna 22 can be, for example, about 915 megaHertz (MHz). The working frequency of the antenna 22 can be adjusted to be applied to receive signals from the RFID tags of the files and transmit the signals to an external device. Furthermore, the antennas 22 are electrically connected to the circuit board 16.

The slots 146 receive files therein, and each slot 146 receives one file. Each antenna 22 can establish a wireless communication with an RFID tag of the file in the corresponding slot 246 to read information stored in the corresponding RFID tags, and transmits the information of the RFID tags. The information at least includes a summary of the file. In an exemplary embodiment, the metal interval boards 144 can shield against electromagnetic interference from neighboring antennas 22.

The file storage device 50 further includes a processing unit 32, a first transceiver 34, and an indicator 36. In an exemplary embodiment, the processing unit 32, the first transceiver 34, and the indicator 36 are integrated in the circuit board 16. The antennas 22, the first transceiver 34, and the indicator 36 are electrically connected to the processing unit 32.

The antennas 22 are configured for transmitting information of the RFID tags and an identify information of itself to the processing unit 32. Each antenna 22 includes an identify information of itself for showing a current location, that means, the identify information of the antenna 22 includes a current location data of the antenna 22. The processing unit 32 is configured for processing information and signals, and also forwarding the information and signals among the antennas 22, the first transceiver 34, and the indicator 36. In an exemplary embodiment, the first transceiver 34 is a Bluetooth module, which is configured for transmitting and receiving the information and signals to/from the terminal device 70. The indicator 36 can be a Light-Emitting Diode (LED) or a buzzer. In an exemplary embodiment, the indicator 36 is a LED. A number of the indicator 36 is equated to a number of the antennas 22, each indicator 36 is corresponding to one antenna 22. The indicator 36 can communicate with and be controlled by the processing unit 32, and then lights up to indicate a current location of the corresponding antenna 22.

The terminal device 70 can be a device with data processing function, such as a reader, a personal digital assistant (PDA), a palmtop computer. The terminal device 70 includes a second transceiver 72, a processor 74, and a user interface (UI) unit 76. The second transceiver 72 and the UI unit 76 are electrically connected to the processor 74. The processor 74 is configured for storing and processing the information and signals, and also forwarding the information and signals between the second transceiver 72 and the UI unit 76. The processor 74 can further convert the information of the RFID tags and the identify information of the antennas 22 to digital data for being display in the UI unit 76. In an exemplary embodiment, the second transceiver 72 is a Bluetooth module, which is configured for communicating with the first transceiver 34, thereby receiving and transmitting the information and signals from/to the first transceiver 34. The UI unit 76 can be a display having touch-control function. The UI unit 76 displays the digital data of the RFID tags information and the current location data of the antennas 22, to show the summary and the current locations of the antennas 22. Users can browse the information of the files and current locations of the antennas 22 via the UI unit 76 and further input a search instruction using the UI unit 76, for searching a right file needed. The processor 74 can further generate a controlling command according to the search instruction, the controlling command is for efficiently searching the right file in the file storage device 50.

Each slot 146 has an antenna 22 and receives a file with a RFID, the antenna 22 establishes wireless communication of the RFID, the antenna 22 transmits the information of the RFID and the identify information of itself to the processing unit 32. Then the information is forwarded to the processor 74 via the first transceiver 34 and the second transceiver 72, the processor 74 stores the information, including information of the files and current location data of the antennas 22.

Figure 5:
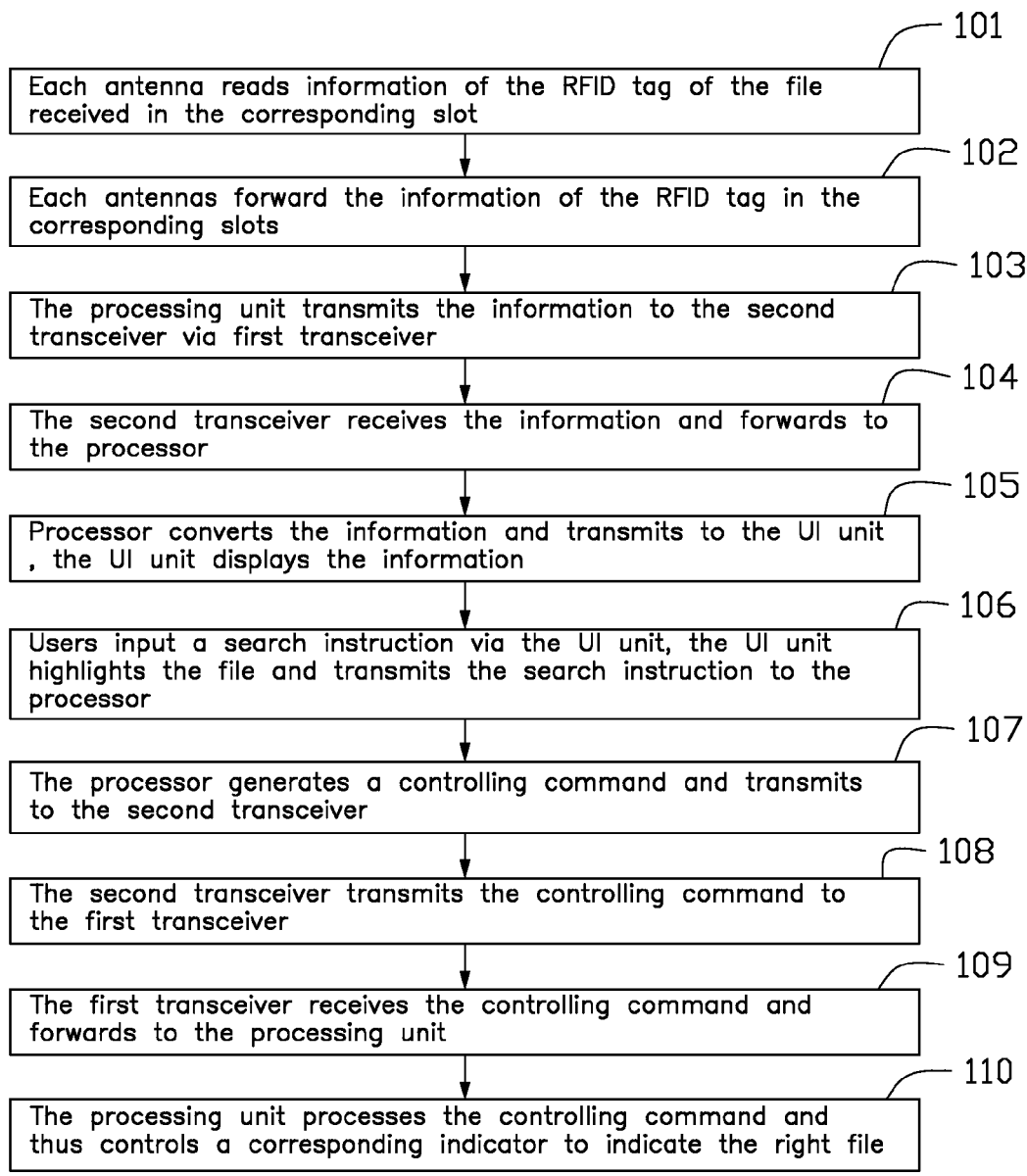
FIG. 5 is a flowchart of a file searching method of the file searching system.

FIG. 5 illustrates a flowchart of a file searching method of the file searching system 100. The file storage device 50 receives a plurality of files with RFID tags in the slots 146. The file searching method includes steps as follows:

In block 101, each antenna 22 reads information of the RFID tag of the file received in the corresponding slot 146. The information of the RFID tag at least includes a summary of the file.

In block 102, each antennas 22 forwards the information of the RFID tag in the corresponding slot 146 and an identify information of itself to the processing unit 32. The identify information of each antenna 22 includes a current location data of the antenna 22.

In block 103, the processing unit 32 receives the information transmitted by all antennas 22 and transfers to the first transceiver 34, and then the first transceiver 34 transmits the information to the second transceiver 72. In at least one embodiment, the processing unit 32 converts the information into a Bluetooth format, which can be transmitted and received by the first transceiver 34 and the second transceiver 72.

In block 104, the second transceiver 72 receives the information and forwards to the processor 74.

In block 105, the processor 74 receives and stores the information and converts the information to digital data, and further transmits to the UI unit 76, thus the UI unit 76 displays the information. In at least one embodiment, when the information is converted to the digital data, the digital data can be displayed by the UI unit 76. The UI unit 76 displays the information of the RFID tags and the identify information of the antennas 22, thus the summary of the files and the current locations of the antennas 22 in the file storage device 50 can be read by users.

In block 106, users input a search instruction via the UI unit 76, the UI unit 76 highlights the file summary data and the current location data, and transmits the search instruction to the processor 74. In at least one embodiment, the search instruction is for searching a right file in the file storage device 50.

In block 107, the processor 74 receives the search instruction and generates a controlling command, and further transmits the controlling command to the second transceiver 72.

In block 108, the second transceiver 72 receives the controlling command and transmits to the first transceiver 34.

In block 109, the first transceiver 34 receives the controlling command and forwards to the processing unit 32.

In block 110, the processing unit 32 processes the controlling command and thus controls a corresponding indicator 36 to work according to the search instruction, the indicator 36 works to indicates the right file that the search instruction is searching for. Therefore, the user can efficiently find the right file according to the indication.

Since a wireless communication between the file storage device 50 and the terminal device 70 is established, the antenna 22 corresponding to one slot 146 reads information from FRID tag of the slot 146 when a file is placed in the slot 146, or the antenna 22 captures null information when the file is took away from the slot 146, which may present a real-time state of the slots 146 via the UI unit 76.

The true location of a particular file can be discovered very quickly, and all the files received in the file storage device 100 can report themselves as required, saving time and overcoming mistakes.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A file searching system comprising:
a file storage device defining a plurality of slots for storing files having radio frequency identification (RFID) tags, the file storage device having a plurality of antennas and associated indicators mounted to a corresponding slot one to one;
a terminal device wirelessly communicated with a first transceiver of the file storage device, the terminal device comprising a user interface (UI) unit;
wherein each antenna is configured to receive RFID tag self-identifying information from an RFID tag stored in the corresponding slot and transmit the RFID tag self-identifying information along with antenna self-identifying information to the first transceiver for transmission to the terminal;
the first transceiver is configured to receive control commands from the terminal and the file storage device actuates one of the plurality of indicators based on a received control command;
wherein the file storage device further comprises a plurality of interval boards spaced in series and a plurality of housings, each of the slot is formed between each consecutive interval board, each antenna is coupled to one of the interval boards, each of the housings longitudinally receives one interval board with one of the antennas;
wherein based on received antenna self-identifying information the terminal displays a location of the antenna transmitting the antenna self-identifying information in the UI unit;

wherein the file storage device further comprises a processing unit, the processing unit is electrically connected to the antennas, the first transceiver, and the indicators, to exchange information and signals thereamong, the first transceiver is configured to transmit and receive information and signals to/from the terminal device;

wherein the terminal device further comprises a second transceiver and a processor, the processor is electrically connected to the second transceiver and the UI unit, to exchange the information and signals therebetween, the second transceiver is wirelessly communicated with the first transceiver;

wherein the first transceiver and the second transceiver are Bluetooth modules;

wherein the processing unit receives the information from the antennas and forwards to the first transceiver, the processing unit converts the information to Bluetooth signal that can be transmitted by the first transceiver and received by the second transceiver;

wherein the processor receives the Bluetooth signal transferred by the second transceiver and converts to digital data that can be display by the UI unit, based on received antenna self-identifying information the terminal displays locations of the antennas in all slots in the UI unit;

wherein when the searching instruction is inputted via the UI unit, the processor generates a controlling command according to the searching instruction, then the controlling command is transmitted to the processing unit via the second transceiver and the first transceiver, the processing unit controls a corresponding indicator to work, thereby indicating a corresponding slot being searched.

2. The file searching system as claimed in claim 1, wherein the terminal is configured to receive a searching instruction to identify an RFID tag or antenna.

3. The file searching system as claimed in claim 1, wherein the terminal generates a control command based on the search instruction and transmits the control command to the storage device.

4. The file searching system as claimed in claim 1, wherein the file storage device further comprises a circuit board, the antennas are electrically connected to the circuit board.

5. The file searching system as claimed in claim 1, wherein the interval boards and the base are made of metal material.

6. The file searching system as claimed in claim 1, wherein the indicator is a Light-Emitting Diode (LED), the corresponding indicator lights up when it works.

7. The file searching system as claimed in claim 1, wherein the UI unit is a display with touch-control function.

8. A file searching method comprising:
reading RFID tag self-identifying information from RFID tags on the files received in slots;
transmitting the RFID tag self-identifying information along with antennas self-identifying information to a terminal device;
converting the RFID tag self-identifying information and the antennas self-identifying information into digital data that to be displayed;
displaying the information of the RFID tags of all the files;
inputting a searching instruction to search a right file in the slots;
generating a controlling command according to the searching instruction; and
actuating a corresponding indicator to indicate a current location of one of the slots that the right file received in;

wherein each of the slots is formed between two consecutive interval boards, each antenna is coupled to one of the interval boards, one interval board with one of the antennas are longitudinally received in one housings;

wherein based on received antenna self-identifying information the terminal displays a location of the antenna transmitting the antenna self-identifying information in the UI unit;

wherein the file storage device further comprises a processing unit, the processing unit is electrically connected to the antennas, the first transceiver, and the indicators, to exchange information and signals thereamong, the first transceiver is configured to transmit and receive information and signals to/from the terminal device;

wherein the terminal device further comprises a second transceiver and a processor, the processor is electrically connected to the second transceiver and the UI unit, to exchange the information and signals therebetween, the second transceiver is wirelessly communicated with the first transceiver;

wherein the first transceiver and the second transceiver are Bluetooth modules;

wherein the processing unit receives the information from the antennas and forwards to the first transceiver, the processing unit converts the information to Bluetooth signal that can be transmitted by the first transceiver and received by the second transceiver;

wherein the processor receives the Bluetooth signal transferred by the second transceiver and converts to digital data that can be display by the UI unit, based on received antenna self-identifying information the terminal displays locations of the antennas in all slots in the UI unit;

wherein when the searching instruction is inputted via the UI unit, the processor generates a controlling command according to the searching instruction, then the controlling command is transmitted to the processing unit via the second transceiver and the first transceiver, the processing unit controls a corresponding indicator to work, thereby indicating a corresponding slot being searched.

9. The file searching method as claimed in claim 8, further comprising broadcasting wireless signal to the slots, the RFID tag in each slot receiving the wireless signal, thereby establishing wireless communication with the RFID tags of all the files.

10. The file searching method as claimed in claim 9, further comprising converting the information into Bluetooth signal that can be transmitted to the terminal device, and then the terminal device converting the Bluetooth signal into digital data, thus reverting the information of the RFID tags.

11. The file searching method as claimed in claim 10, wherein the steps of capturing the information, transmitting the information, and controlling the corresponding indicator are operated by a file storage device; the steps of converting the information, displaying the information, inputting the searching instruction, and generating the controlling command are operated by the terminal device.

* * * * *